(12) United States Patent
Shen et al.

(10) Patent No.: US 9,860,340 B2
(45) Date of Patent: Jan. 2, 2018

(54) SERVICE FUNCTION CHAINING BRANCHING

(71) Applicant: Cisco Technology, Inc., San Jose, CA (US)

(72) Inventors: Naiming Shen, Santa Clara, CA (US); Keyur P. Patel, San Jose, CA (US); Carlos M. Pignataro, Raleigh, NC (US); James N. Guichard, New Boston, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/606,267

(22) Filed: May 26, 2017

(65) Prior Publication Data

US 2017/0264713 A1    Sep. 14, 2017

Related U.S. Application Data

(63) Continuation of application No. 14/838,963, filed on Aug. 28, 2015, now Pat. No. 9,723,106.

(51) Int. Cl.
  H04L 12/28    (2006.01)
  H04L 29/08    (2006.01)
  (Continued)

(52) U.S. Cl.
  CPC ........ H04L 67/327 (2013.01); H04L 41/0806 (2013.01); H04L 41/5054 (2013.01); H04L 41/5058 (2013.01); H04L 45/44 (2013.01)

(58) Field of Classification Search
  CPC .............. H04L 67/327; H04L 41/0806; H04L 41/5054; H04L 41/5058; H04L 45/44
  (Continued)

(56) References Cited

U.S. PATENT DOCUMENTS

| 5,394,436 A | 2/1995 | Meier et al. |
| 6,363,411 B1 * | 3/2002 | Dugan .............. H04M 3/42136 379/201.01 |

(Continued)

OTHER PUBLICATIONS

J. Halpern, et al., "Service Function Chaining (SFC) Architecture", Network Working Group, Internet-Draft, draft-ietf-sfc-architecture-11, Jul. 24, 2015, 26 pages.

*Primary Examiner* — Thai Hoang
(74) *Attorney, Agent, or Firm* — Edell, Shapiro & Finnan, LLC

(57) ABSTRACT

A system comprising a plurality of service nodes, a controller and a network device in communication with the controller. Each of the plurality of service nodes is configured to support one or more service functions to establish a service function chain that includes a plurality of service functions to be performed by routing traffic among the plurality of service nodes. The controller is configured to generate provisioning information for the service function chain. The provisioning information includes at least one condition upon which a service function reclassification or branching operation is to be performed by at least one service node. The network device is in communication with the controller, and is configured to distribute the provisioning information for the service function chain to the plurality of service nodes using a distributed routing protocol.

20 Claims, 7 Drawing Sheets

(51) Int. Cl.
*H04L 12/24* (2006.01)
*H04L 12/721* (2013.01)

(58) Field of Classification Search
USPC .......... 370/352–356, 389–394, 395.3–395.4,
370/400–409, 229–238, 248, 250–253
See application file for complete search history.

(56) References Cited

U.S. PATENT DOCUMENTS

| | | | |
|---|---|---|---|
| 6,757,249 B1 * | 6/2004 | Kejriwal | H04L 47/10 |
| | | | 370/235.1 |
| 6,779,030 B1 | 8/2004 | Dugan et al. | |
| 6,934,250 B1 * | 8/2005 | Kejriwal | H04Q 3/0091 |
| | | | 370/229 |
| 7,466,703 B1 * | 12/2008 | Arunachalam | H04L 45/00 |
| | | | 370/351 |
| 7,483,374 B2 | 1/2009 | Nilakantan et al. | |
| 7,515,525 B2 | 4/2009 | Appanna et al. | |
| 8,601,126 B2 | 12/2013 | Bruno et al. | |
| 8,743,885 B2 | 6/2014 | Khan et al. | |
| 8,949,459 B1 | 2/2015 | Scholl | |
| 2003/0133411 A1 | 7/2003 | Ise et al. | |
| 2014/0233385 A1 | 8/2014 | Beliveau et al. | |
| 2014/0334488 A1 | 11/2014 | Guichard | |
| 2014/0351452 A1 * | 11/2014 | Bosch | H04L 67/10 |
| | | | 709/242 |
| 2014/0369356 A1 | 12/2014 | Bryant et al. | |
| 2015/0381493 A1 * | 12/2015 | Bansal | H04L 45/30 |
| | | | 370/392 |
| 2017/0064039 A1 | 3/2017 | Shen et al. | |

* cited by examiner

SERVICE FUNCTION CHAINING BRANCHING

CROSS REFERENCE TO RELATED APPLICATION

This application is a continuation of U.S. application Ser. No. 14/838,963, filed Aug. 28, 2015, the entirety of which is incorporated herein by reference.

TECHNICAL FIELD

The present disclosure relates to service function chaining.

BACKGROUND

Service function chaining enables virtualized networking functions to be implemented as part of a cloud network. A Service Function Chain defines an ordered list of a plurality of service functions (e.g., firewall, compression, intrusion detection/prevention, load balancing, etc.) that may be applied to packet flows in the network. A flow enters the network through a classifier node that generates a Service Function Path for that flow according to the Service Function Chain policy. The classifier node encapsulates each packet of the flow with a network service header that indicates the service functions to which the flow will be subjected, and the order the service functions will be applied.

Service function chaining and network service headers provide a scalable, extensible, and standardized way of sharing metadata between both network nodes and service nodes within a network topology. This allows for disparate nodes that require shared context, but do not communicate directly, to share that context via metadata with the packets traversing the network or service topology.

DESCRIPTION OF EXAMPLE EMBODIMENTS

Overview

Figure 1A:
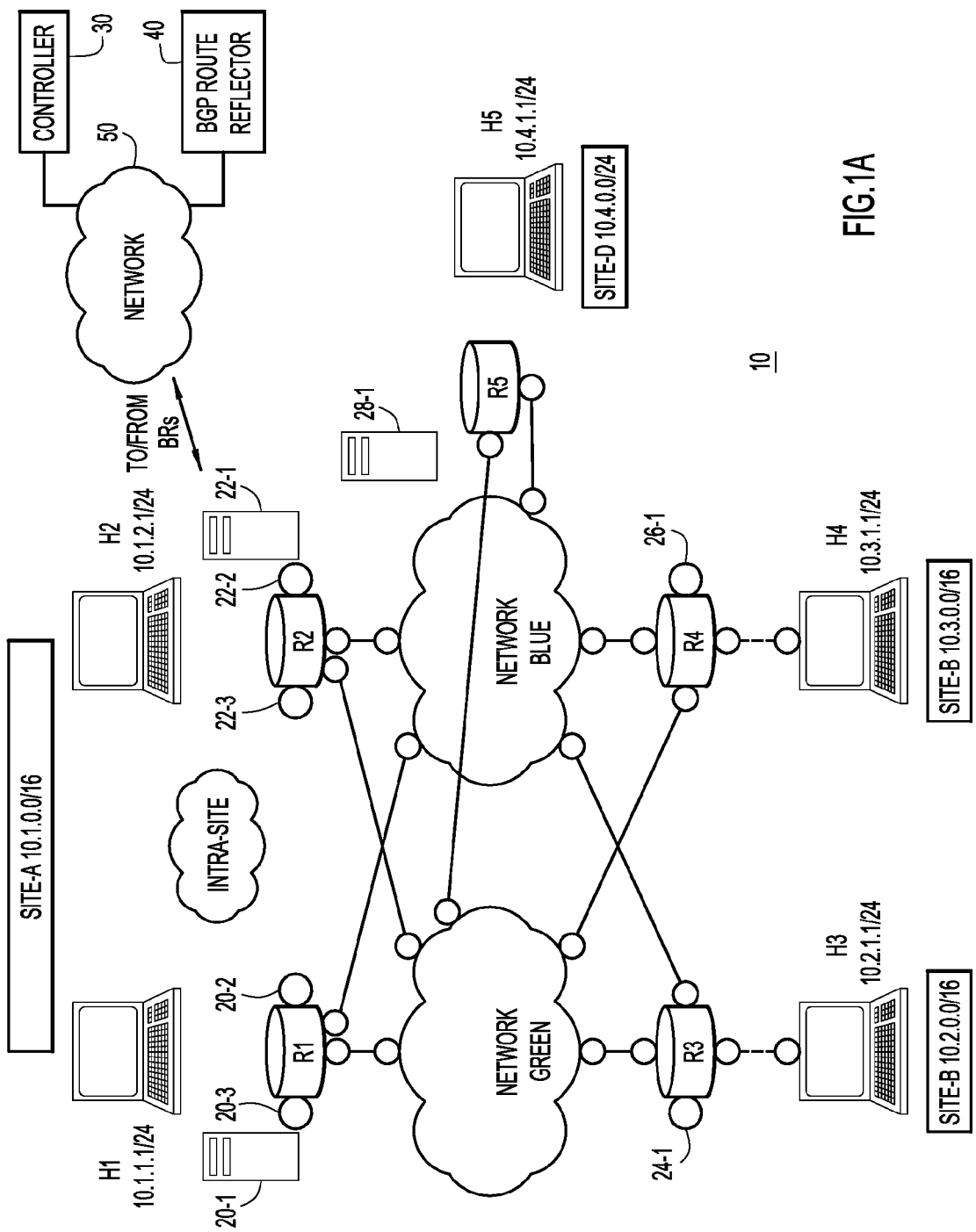
FIGS. 1A and 1B illustrate a networking environment that employs a distributed routing protocol to configure dynamic reclassification and branching using a distributed routing protocol, according to an example embodiment.

In accordance with one embodiment, a system is provided comprising a plurality of service nodes, a controller and a network device in communication with the controller. Each of the plurality of service nodes is configured to support one or more service functions to establish a service function chain that includes a plurality of service functions to be performed by routing traffic among the plurality of service nodes. The controller is configured to generate provisioning information for the service function chain. The provisioning information includes at least one condition upon which a service function reclassification or branching operation is to be performed by at least one service node. The network device is in communication with the controller, and is configured to distribute the provisioning information for the service function chain to the plurality of service nodes using a distributed routing protocol.

EXAMPLE EMBODIMENTS

Often in a Service Function Chain (SFC) there is a need for 'Reclassification' and 'Branching'. An example is when a first 'Classification' determines the service function path for a list of service functions for the packet, and the deep-packet-inspection is one of the services in the chain. As is known in the art, Classification involves determining that traffic satisfies classification rules and forwarding such traffic according to a specific service function path. For example classification can be as simple as an explicit forwarding entry that forwards all traffic from one address into the service function path. Multiple classification points are possible within a service function path.

After performing the deep packet inspection function, the packet is determined to be a potential attack suspect and instead of continuing the normal services remaining in the service function chain, it should be branched out to a different service function packet where the packet will possibly be further analyzed, scrubbed and/or dropped.

One problem with 'Reclassification' and 'Branching' is how to do this in scalable manner, without having to statically provision the exact service function path with different policies on the certain service function forwarder. For example, an operator could statically provision the service function forward associated with the deep packet inspection function to match a number of service function paths, determine the results of deep packet inspection and re-specify a mapping onto a set of new service function paths to branch out. This is complex.

Presented herein are a system and method to distribute SFC routing information using a distributed routing protocol. In one example, the distributed routing protocol is the Border Gateway Protocol, but this is only an example. Examples of other distributed routing protocols that may be used include the Internal Gateway Protocol (IGP) and the Locator/ID Separation Protocol (LISP). The following description makes reference to BGP as one example, but again this is not meant to be limiting.

Reference is first made to FIG. 1A. FIG. 1A illustrates an example network environment 10 that includes four sites: Site-A, Site-B, Side-C and Site-D. R1-R5 are border routers on a Dynamic Multipoint Virtual Private Network (DM-VPN) and service functions are performed or dispatched on the border routers (BRs) R1-R5. For example, service functions 20-1, 20-2 and 20-3 are dispatched on R1. Service function 20-1 may perform Wide Area Application Services (WAAS), service function 20-2 may perform application visibility and control (AVC) services, and service function 20-3 may perform firewall services. Similarly, on R2 there are service functions 22-1, 22-2 and 22-3, where 22-1 may perform WAAS, service function 22-2 may perform application AVC services, and service function 22-3 may perform firewall services. On R3, service function 24-1 performs AVC services and on R4, service function 26-1 performs AVC services. On R4, service function 26-1 performs AVC services, and on R5, service function 28-1 performs deep packet inspection (DPI) services.

There are hosts H1 and H2 at Site-A, host H3 at Site-B, host H4 at Site-C and host H5 at Site-D. Also in this example, a first DMVPN may be established (shown as Network Green 30) in which various ones of the border routers R1-R5 may participate, and a second DMVPN (shown as Network Blue 40) in which various ones of the border routers R1-R5 may participate.

In one example, host H1 sends a packet to H3, from Site-A to Site-B through a number of services. Return traffic from host H3 might go on another path. Utilizing service function chaining, policies can be established such that bi-directional flow goes through the same set of stateful services, if desired.

For example, using R1 and R2 at Site-A as SFC classifiers, any flow outbound of Site-A when the source address (src) is in 10.1.1.0/24 or inbound of Site-A when the destination address (dst) is in 10.1.1.0/24 uses the firewall service function 20-3 at R1, the AVC service function 20-2 at R1, and the WAAS service function 20-1 at R1. Likewise, traffic in 10.1.2.0/24 uses the service functions 22-1, 22-2 and 22-3 at R2.

FIG. 1A further shows a controller 30 (also known as a services controller) that generates the data for the policies associated with a SFC for provisioning the service functions of nodes R1-R5. There is a more dynamic and efficient way of achieving this, and to this end, FIG. 1, shows a BGP Router Reflector (RR) 40. The controller 30 and the BGP RR 40 are connected to a network 50 which is in turn connected to the routers R1-R5. The controller 30 generates the provisioning information for a SFC or multiple SFCs, and this information is supplied to the BGP RR 40, which in turn sends BGP advertisement messages to the routers R1-R5 in accordance with the BGP.

More specifically, each of the edge routers R1-R5 advertises its services to BGP RR 40, with service function information, IP address, site-identifier (ID), etc. The controller 30 learns about the services on R1-R5 from the BGP RR 40. The controller 30, based on the policies, makes the SFC provisioning decisions, and supplies them to the BGP RR 40. The controller 30 advertises the SFC definitions as BGP Network Layer Reachability Information (NLRI) to the BGP RR 40, which in turn distributes the NLRIs to the edge routers R1-R5.

There are three BGP NLRIs for a BGP service function chain in the process described above.

Service Advertise NLRI: This is what the service nodes (also called service function forwarder (SFF)) use to advertise the IP address and service function(s) they support to the BGP RR 40, and the controller 30 can build specifications for network services in a SFC using the Service Advertise NRLIs. The controller 30 can keep track of liveliness of the service nodes and modify the SFC specifications accordingly.

SFC Classifier NLRI: This specifies which packet to classify and to which a SFC path identifier (SFC-PID) is to be launched. This NLRI can use the BGP Flow-Spec Address Family Indicator (AFI) specification. The extended communities can be defined to specify the 'site location' identity, the 24 bits SFC-PID, and optional initial metadata string. A 5-tuple is assumed in general, but the implementation can also take items such as application identifier (APP-ID).

SFC Path NLRI: This specifies the SFC-PID and Service Index, and it makes up an ordered list with other Service Indices of the SFF IP address and other information. This is used for the service node to identify based on the Path-ID and Service Index in order to perform the service specified, and to launch the service transport to reach the next service node. For example, the SFC-PID 13890 is an ordered list of (1, 10.1.1.1, 'FW'), (2, 11.1.1.1, "LB"), (3, 12.1.1.1, "DPI").

As a further example in connection with the topology shown in FIG. 1, the controller 30 advertises to BGP RR that:

SFC Classifier NLRI: src=10.1.1.0/24 dst=any; attributes Site-ID 'A' and SFC-PID 1001, two hops SFC Classifier NLRI: dst=10.1.1.0/24 src=any; attributes Site-ID 'A' and SFC-PID 1002, two hops SFC Path NLRI: 1001; attribute with the ordered list: (2, R1-FW, "FW-ID"), (1, R5-DPI, "DPI-ID")

SFC Path NLRI: 1002: ordered list: (2, R1-FW, "FW-ID"), (1, R1-AVC, "AVC-ID")

At Site-A, both R1 and R2 will learn from the BGP RR 40 the two sets of SFC advertisements. Both routers will therefore be configured as to how to classify any flow into a defined SFC Path, and also from the path definitions, the border routers will be informed as to how to follow the SFC hop-by-hop (regardless the service node is within Site-A or not).

Figure 1B:
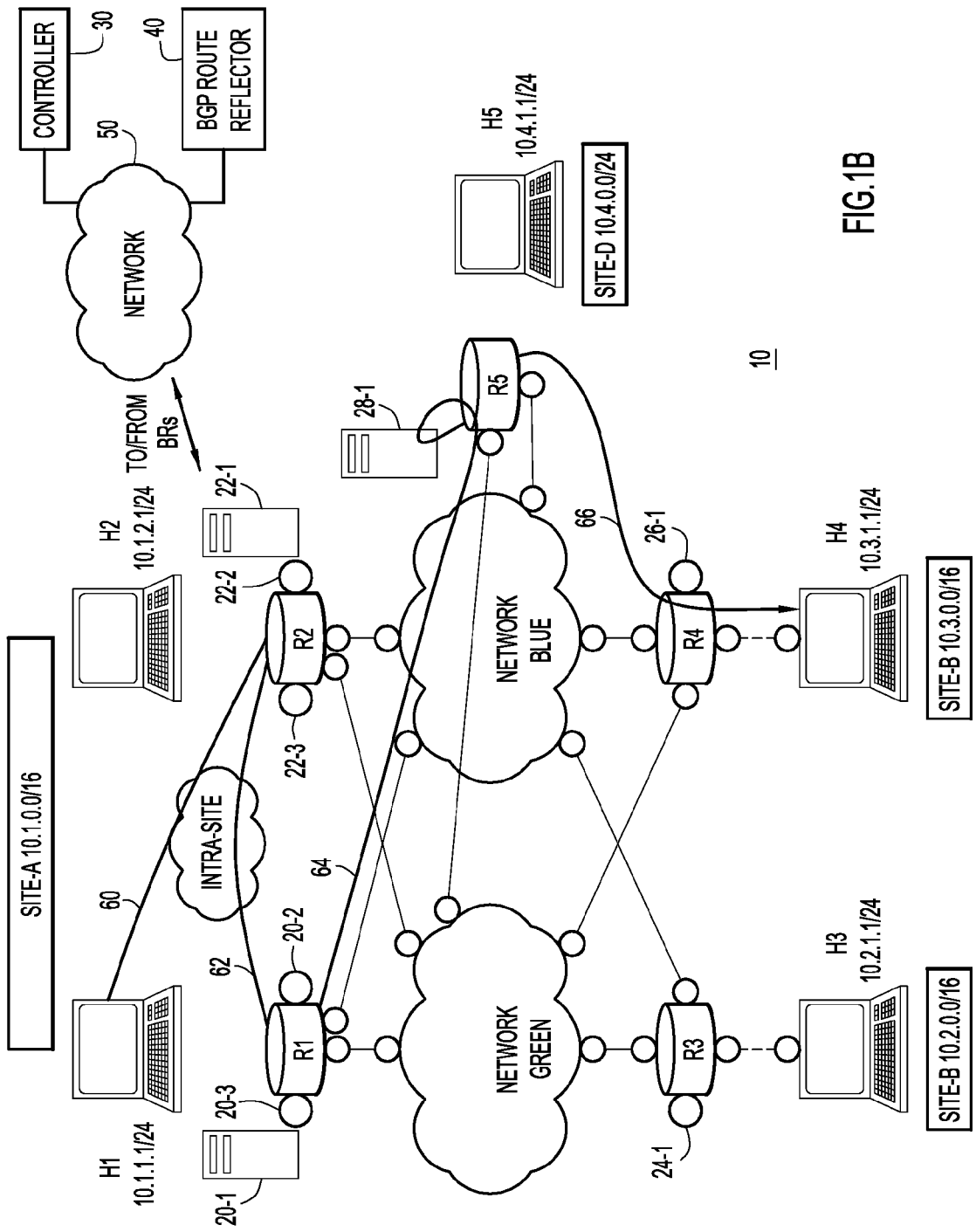

Reference is now made to FIG. 1B for an example of a packet flow. At 60, host H1 (10.1.1.1) sends a packet to host H4 (10.3.1.1). As shown at 62, either R1 or R2 will classify the flow and tunnel the packet to service function 20-2 on R1. At 64, R1 then tunnels the packet to service function 28-1 on R5, and at 66, R5 tunnels the packet to R4 for delivery to host H4. Destination Site-C, where host H4 is located, might have its own SFC operations. De-coupling the site-to-site complete chaining reduces complexity.

When host H4 (10.3.1.1) sends back the packet to host H1, upon arriving on either R1 or R2, the flow will be classified to SFC-PID 1002 (dst=10.1.1.0/24) and the same firewall 20-2 will be visited at R1.

As used herein, the terms "service node," "service function node" and "service function forwarder" are used interchangeably. BRs R1-R5 shown in FIGS. 1A and 1B are examples of such devices.

In accordance with embodiments presented herein, a mechanism is provided to enable a 'Reclassification' and 'Branching' capability of a SFC using BGP advertisements. This can be performed by looking at metadata in a network service header (NSH) of a packet. For example, if there are two sub-flows within the same flow (e.g., subset of packets that need to go through an additional filter, such as a parental control filter), these techniques provide a non-linear graph-like path to the service function path.

BGP is used to advertise a conditional action for a particular service path, and that action could be a Reclassification or a Branching capability. In other words, traffic is dynamically (on-the-fly) branched or reclassified onto another service path using BGP as a distribution mechanism. The controller 30 injects BGP information to the BGP RR 40. The service nodes can thereafter dynamically query the BGP RR 40 when the NLRI information is needed. Alternatively, the BGP RR 40 distributes the BGP information to all service nodes in the network. The controller 30 announces the parameters for a flow which need to be matched to go through a particular SFC path, and in particular distributes information, using BGP, for conditional SFC branching or reclassification. Said another way, instead of pre-programming SFC branching from the centralized controller 30 that configures a service function or service function forwarder, BGP is used to distribute that condition. Therefore, when a service node learns about a particular service path, it can be configured with a condition that pushes the traffic to a different service path than what was pre-programmed. This is particular useful when a situation arises where it is desired not to follow the original SFC path definition, and instead it is necessary to cause a conditional branching in the middle of a SFC, based on a 5-tupe match or yes/no condition.

For example, the service node SFFx receives a packet with an NSH, the NSH indicates the packet is for service function path 1000. SFFx may not have the information on the router/switch as to how to handle that packet. SFFx can query the BGP RR 40 to have to BGP RR 40 advertise the NLRI for service function path 1000 over. SFFx may need to do an exception jump to service function path 3000, and it can query the BGP RR 40 again for this information. Thus, the service node only obtains/has the information when it needs it. The mechanism that the service node uses to query the BGP RR 40 to send over the NLRI is similar that defined in RFC-7543.

To this end, a new field is inserted into the SFC Path NLRI described above. After the service function at that service node is finished, the service node evaluates information in this new field o the SFC Path NLRI to determine where to go next with the traffic. As explained above, the SFC Path NLRI specifies the SFC-PID and an ordered list of (Service Index, SFF IP address, and Service Function name). A fourth element indicating a 'Condition' is added to this information, and there are 3 types of information possible for this fourth element.

The first type of 'Condition' is a 5-Tuple Flow Reclassification. This specifies 5-tuple flow parameters (source IP address, source port number, destination IP address, destination port number, protocol) that indicate that once this service hop is reached, the NSH is stripped off the packet, a reclassification is made based on the 5-tuple, and the packet is sent down a new NSH service path. The new NSH service path is obtained from the SFC Classifier NLRI. In other words, for reclassification, a look up is made to the BGP Classifier NLRI to determine how to reclassify based on the 5-tuple.

For example, the SFC Path NLRI is of the form: (3, 10.1.1.1, 'DPI', '5-tuple-flow'). This means that after the DPI operation is performed as defined in this hop of the service function path, the service function will always reclassify to perform the lookup of the SFC Classifier BGP NLRI, which will determine the sub-flow possibly going to a different service function path. If none of SFC Classifier matches the sub-flow using the 5-tuple condition, then the service function path is continued as originally defined.

The second type of 'Condition' is an Exception Branch. This specifies that an exception condition occurs (the service function defines what the exception is), and traffic is sent down this NSH service path with a specified path ID and index. In effect, this causes the NSH header to be replaced. Again, the service function defines the exception itself (e.g., looks like malicious traffic), then sends the traffic to a particular path (e.g., for a security device).

For example, the SFC Path NLRI is of the form: (3, 10.1.1.1, 'DPI', 'exception-to', SFP-x). This means that after the DPI operation, the service function forwarder will select the exception and direct the traffic down the path for service function path 'SFP-x'. The exception condition can be private between the service function forwarder and the service function. If there is no alarm is raised (according to the exception condition defined by the service function forwarder), this service function forwarder will continue the original SFP, otherwise the service function forwarder will select the exception. As another example, if the service function is authentication, the exception condition may be the packet failing the authentication signature check, resulting in the packet being forwarded to a particular path (or dropped).

The third type of 'Condition' is Metadata Branch. This involves looking at the metadata in the NSH and if metadata matches a particular condition, then the traffic is sent to a particular service function path. In other words, the metadata in the NSH of packets is evaluated and if a particular piece of information is present in the metadata, then the traffic is automatically branched to a particular service function path. Otherwise, continue on the original path.

For example, the SFC Path NLRI is of the form: (3, 10.1.1.1, 'DPI', 'metadata-branch', 'SFP-y'). The instructs the service function forwarder to examine the NSH metadata, and if the metadata has the exception condition defined, then branch the traffic to the new service function path 'SFP-y'. As another example, the metadata in a packet may define a list of conditions: if matching SocialMedia-video, Streaming-video, etc. A DPI function at the service node checks the packet and if there is a match to one of the conditions (the packet is associated with SocialMedia-video or Streaming-video) in the metadata portion of the NSH header, the service node will direct the packet to a specified new service path identifier.

For the second and third condition types, the service function is configured via an out-of-band mechanism. That is, the actual service path and the indication to use that exception would be advertised in BGP. These are policies defined by the controller 30 and are translated into a BGP advertisement into the network.

Thus, the SFC path NLRI becomes (hop-number, SFF IP address, {service-ID, 'Condition'}). The 'Condition' can be (1) 5-Tuple Flow Reclassification; (2) Exception Branch; or (3) Metadata Branch, as defined above. If the interest is sub-flows, then the 'Condition' can be a '5-Tuple Reclassification', for example.

Importantly, the service function has advertised this capability and it can reclassify or branch based on the 'Condition'. The result of this Condition is to use the SFC Classifier NLRI that indicates the new service path ID to which to branch. More specifically, the service function can use attributes such as the service path ID or a mask on the metadata to perform branching, in which case the SFC Classifier NLRI advertisement can have more complex rules (e.g., "if it is SFP ID X and ?"). Said another way, when a metadata lookup is to be performed to determine whether to branch the packet to another service path, there is complex logic that can be used, if desired, for the branching decision. Thus, instead of the simple match determination logic such as, for example, if metadata contains 'SocialMedia-video' more complex logic is used. As an example, if the current traffic matches service path identifier 100—service path 150, and the DPI result is 'Google+', then perform the more complex logic, which may be similar to a programming language that can perform multiple condition checks.

There are additional optimizations which are useful in a BGP distributed model for service function chaining. First, the advertisement from service function to the service function forwarder (BGP runs on the service function forwarder, i.e., on the service node (network device)) of the services available for discovery is made by a Gratuitous Address Resolution Protocol/Neighbor Discovery (ARP/ND) message. In some instances, a BGP Service Advertisement NLRI is not useful unless the service function forwarder (e.g., router) can learn the service functions. In this way, the service function forwarder can advertise to the BGP RR 40 and controller 30 via BGP the service functions that it is hosting.

Second, the ability to append an application identifier (App-ID) prior to service function chaining classification may be achieved via Network Based Application Recognition (NBAR). NBAR is a capability on certain routers to recognize a dataflow by inspecting some packets sent. Applications can be intelligently identified and classified using NBAR capabilities. Once applications are classified they can be guaranteed a minimum amount of bandwidth, policy routed, and marked for preferential treatment. This is useful for enterprise Intelligent Wide Area Network (IWAN) services. NBAR can apply the service for the packet (before the service function chaining classification) and attach the App-ID as one parameter into the service function chaining classification as part or even all the information for classification. Then, the App-ID itself can be part of the metadata to be included in packets as they flow through the network.

Figure 2:
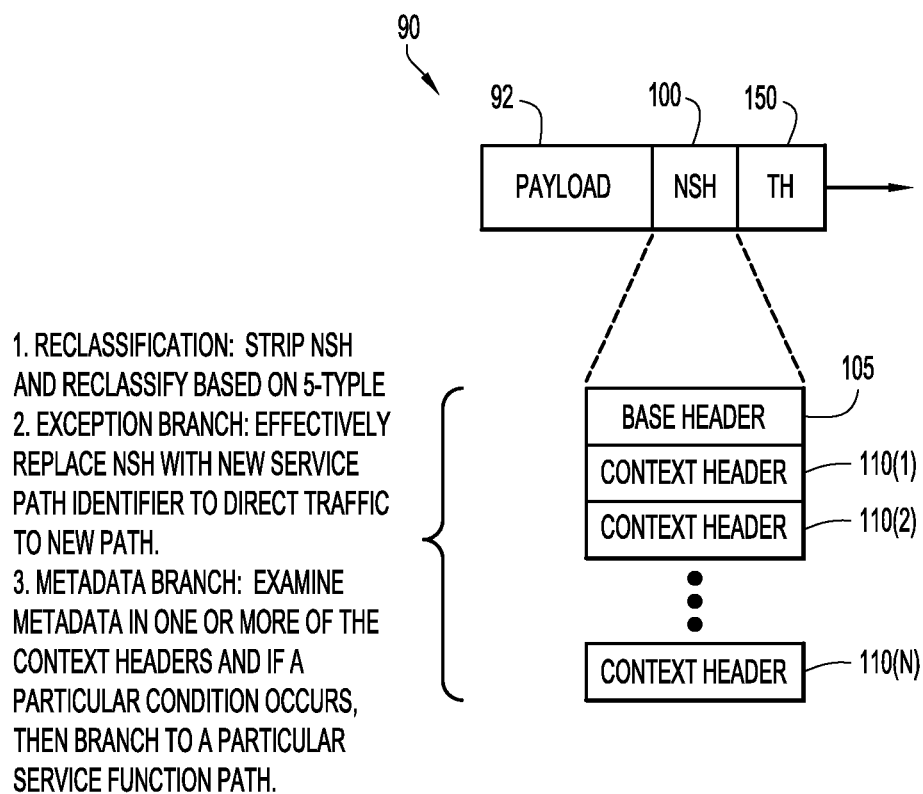
FIG. 2 is a diagram illustrating a packet and various headers of the packet from which information is extracted for performing dynamic reclassification and branching, according to an example embodiment.

Reference is now made to FIG. 2. FIG. 2 shows a packet 90 that may be part of the traffic flows referred to above in connection with FIGS. 1A and 1B. The packet includes a payload 92, NSH 100 and transport header (TH) 150. The NSH 100 consist of a base header 105 and a plurality of context headers 110(1)-110(N). The base header 105 may be composed of two words, but for simplicity it is shown as a single element in FIG. 1. The base header 105 provides information about the NSH 100 and service path identification.

More specifically, the base header 105 includes a flags field, a protocol type field, a service index field, and a service path identifier (ID) field. The flags field includes an "O" bit and a "C" bit. The "O" bit is a one-bit flag that indicates whether a packet is an operations and management (OAM) packet. Service nodes examine the payload and take appropriate action (i.e. return status information) when the "O" bit is set. The "C" bit indicates whether context headers are present. When the "C" bit is set, one or more contexts are in use (i.e. a value placed in a context is significant). The "C" bit specifies that the ordering and sizing of the contexts is predetermined. A "C" bit equal to zero indicates that no contexts are in use and that they can be ignored. If a context header is not in use, the value of that context header is zero.

The protocol type field of the base header 105 indicates the protocol type of the original packet or frame. The service index field specifies time-to-live (TTL) functionality and location within the service path. The service index is decremented by service nodes after performing required service function(s). The service path identifier field identifies a particular service path. A service node uses this identifier for path selection.

The combination of the service path identifier and service index carried within the NSH 100 is used for identification of which specific service functions should be applied to packets. Each service path identifier is a unique value that points to an ordered list of service functions and the service index is decremented by 1 at each service hop so that a service node receiving a packet prefaced with a NSH is able to identify which of the ordered list of service functions it should apply.

The context headers 110(1)-110(N) carry opaque metadata. For example, one of the context headers may be a network platform context that provides platform-specific metadata shared between network nodes, while another context header is a network shared context that provides metadata relevant to any network node, such as the result of edge classification. Another context header may be a service platform context that provides service platform specific metadata shared between service functions, while a still other context header is a service shared context that provides metadata relevant to, and shared, between service functions. Thus, each context header carries service related information of a different scope that is relevant to one or more service functions in the service path.

The context headers 110(1)-110(N) are used to provide platform or service specific metadata that is shared between network nodes. These context headers may be fixed in number and the optional nature of contexts is only in the form of invalid NULL values.

The context headers serve several purposes. For example, they pass metadata to the service nodes for interpretation and for deriving service policy/profiles necessary to deliver services corresponding to the service path. In other words, each context header may be interpreted to derive a service profile used for applying a service at the network node in the service path. In addition, the context headers pass forwarding state to the intermediate network nodes as well as service-functions that participate in realizing the service chain. The context headers may be defined and predetermined by the controller (e.g., controller 20 as shown in FIG. 1) that is in communication with the plurality of service nodes or they may be determined and agree upon, a priori, among the service nodes. In the latter case, each of the plurality of network service stores information indicating the structure and definitions on which the variable set of context headers are based.

The metadata passed in the context headers is specific to the forwarding state carried and in that sense, different forwarding paths might carry different metadata. The controller is responsible for managing and pushing service chains to the network nodes that act as classifiers. The service chains and the forwarding path used to realize the service chains determine the service forwarding path or service-path. The service-path thus becomes the forwarding state that all network nodes have to extract from the context stack in determining the next-hop of the service chain. The network nodes can utilize this forwarding state not only to determine the next-hop for the service chain but also to perform additional transformations on the traffic in accordance with metadata for a particular context header in order to support a variety of service instances, i.e., in order to support a particular service function. As an example, the network nodes can replace the incoming transport with a completely different one that is understood by the service while preserving the context stack. The context headers also enable network nodes to act as proxies to the service functions of another network node and perform mapping of metadata to primitive interfaces understood by the services. Thus, when a network node receives a service header, parses the service header to retrieve the one or more stacked context headers, the network node interprets a forwarding state and a next-hop network node for the service path from the service header, and determines a service action or associated metadata from the set of context headers.

Once the metadata is added to a packet, the outer encapsulation TH 150 is used to forward the original packet and the associated metadata to the start of a service chain. The NSH 100 is independent of the TH 150 encapsulation used and may be encapsulated using any transport scheme now known or hereinafter developed. The presence of the NSH 100 is indicated via protocol type in the outer encapsulation or, in the case of Multi-Protocol Label Switching (MPLS), the presence of the Generic Associate Channel G-Ach Label (GAL).

FIG. 2 further shows what occurs at the packet level for the Reclassification, Exception Branch and Metadata Branch. As explained above, for Reclassification, the NSH of a packet is strip off and a reclassification occurs based on 5-tuple information of the packet. For an Exception Branch, the NSH is effectively replaced with new service path identifier information to direct traffic to a new service function path. For a Metadata Branch, metadata in one or more of the context headers is examined and if a particular condition occurs, then a traffic is directed to (branched) to a particular service function path.

Figure 3:
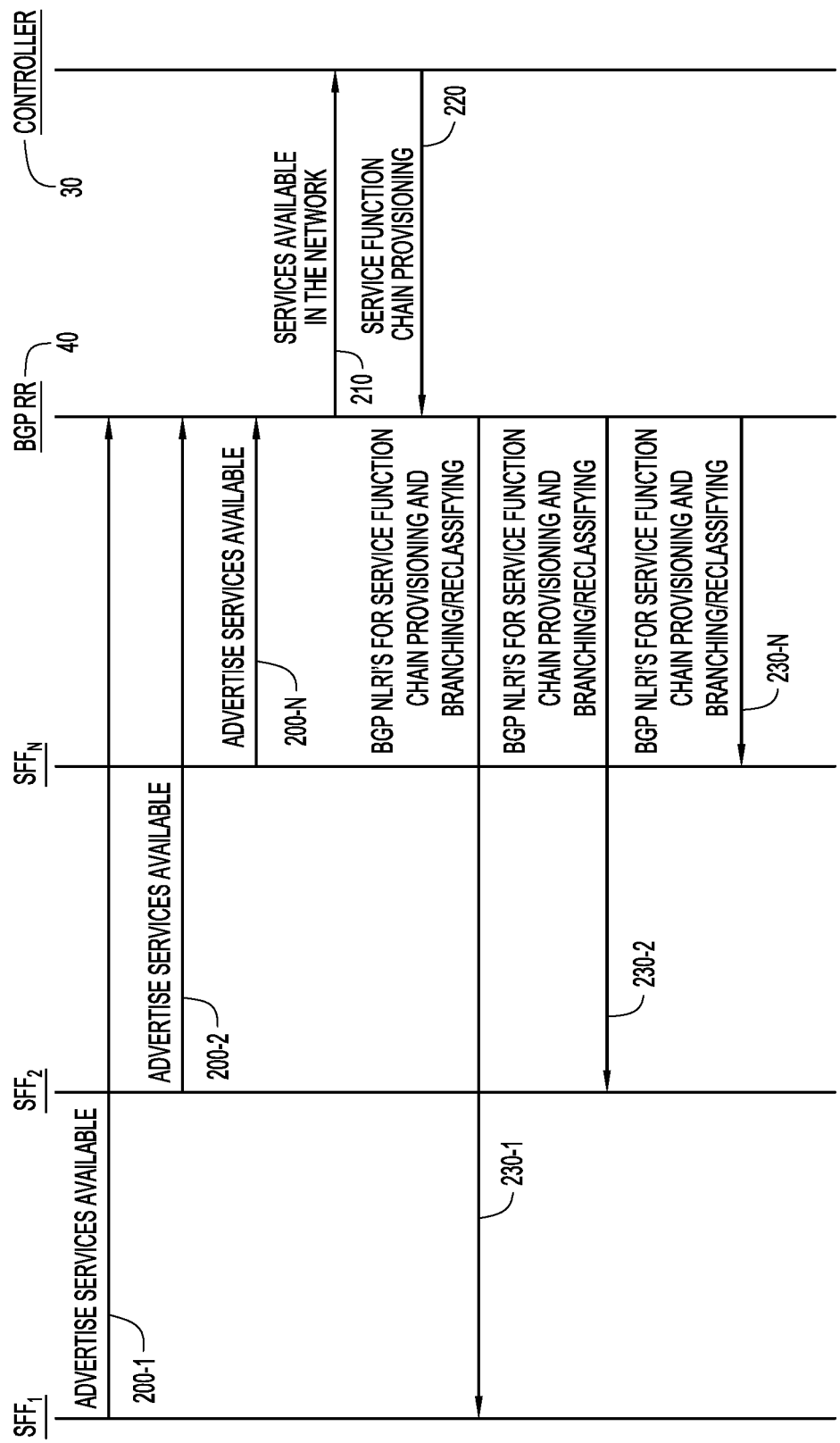
FIG. 3 is a ladder diagram illustrating a sequence of operations by which service function chain provisioning information is ultimately distributed using a distributed routing protocol, according to an example embodiment.

Reference is now made to FIG. 3. FIG. 3 shows a sequence diagram illustrating how BGP is used to distribute service function capabilities and configuration information in a network environment such as that shown in FIGS. 1 and 2. At 200-1, 200-2 through 200-N, each of N service functions $SFF_1$-$SFF_N$ advertises their service(s) to the BGP RR 40 using BGP, if they support BGP communication capability. At 210, the BGP RR 40 notifies the controller 30 as to the services available in the network at the service functions in the network. The controller 30 defines on or more service function chains using the information received at 210.

At 220, the controller generates service function chain provisioning information and sends it to the BGP RR. Then, at 230-1, 230-2 through 230-N, the BGP RR 40 sends BGP NRLI' s for provisioning the service function chain, as well as any branching and/or reclassifying information as described above.

Figure 4:
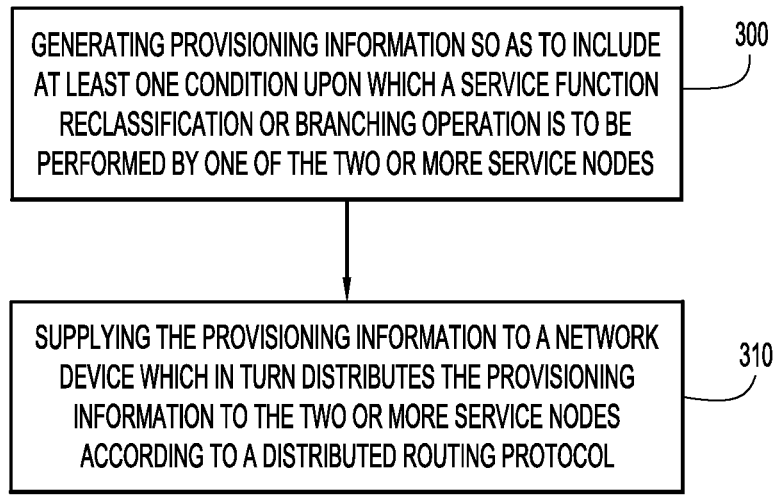
FIG. 4 is a flow chart illustrating operations performed at a controller, according to an example embodiment.

Turning now to FIG. 4, a flow chart is shown that depicts in more detail operations performed at a controller in cooperation with a network device that serves to distribute routing information according to a distributed routing protocol. A controller apparatus (e.g., controller 30 shown in FIGS. 1 and 2) is provided that is configured to generate provisioning information to establish a service function chain that includes a plurality of service functions to be performed by two or more service nodes (e.g., SFFs). At 300, the controller apparatus generates the provisioning information so as to include at least one condition upon which a service function reclassification or branching operation is to be performed by at least one of the two or more service nodes.

At 310, the controller apparatus supplies (e.g., sends) the provisioning information to a network device which in turn distributes the provisioning information to the two or more service nodes according to a distributed routing protocol.

As described above, in one example, the distributed routing protocol may be BGP, IGP, etc. Furthermore, the provisioning information may include routing information in a form (hop-number index, service function node address, {service function identifier, condition}), wherein hop-number index indicates an index of a service function in the service function chain, service node address is an address of a next service node in the service function chain, service function identifier is an identifier of a service function to be performed at a current service node, and condition is the at least one condition. The controller apparatus may, via the BGP RR, receive from the service functions advertisements made according to the distributed routing protocol (such as advertisements in Gratuitous Address Resolution Protocol/ Neighbor Discovery (ARP/ND) messages), the advertisements indicating capabilities of the respective service functions, and such that routing information is generated based on the advertisements received from the service functions.

In one example, the at least one condition a tuple of flow parameters upon which a match to flow parameters in traffic at a given service function will result in a reclassification lookup to determine whether to direct traffic to a particular service function path different from a service function path indicated by a network service header embedded in packets of the traffic. In another example, the at least one condition is an exception indicating that traffic is to be directed to a particular service function path. In still another example, the at least one condition is a metadata branch that instructs a service function node to examine metadata in a network service header of packets to determine if the metadata matches a particular condition and if so then branch the traffic to a particular service function path.

Figure 5:
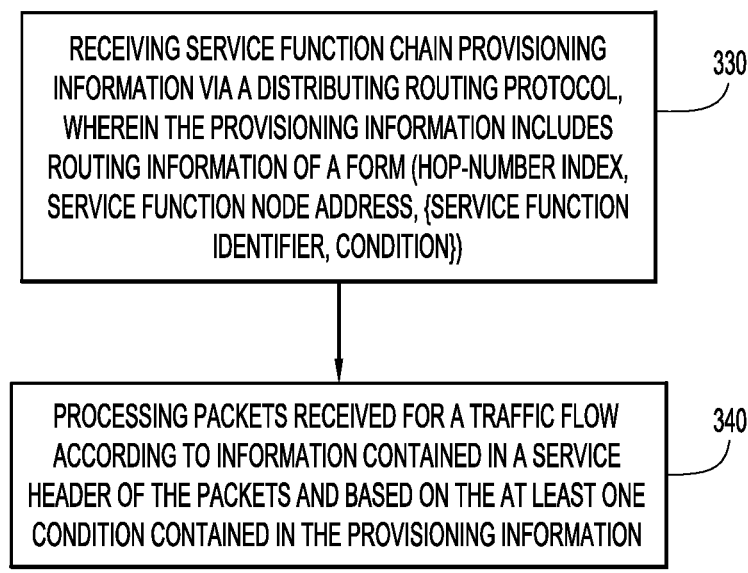
FIG. 5 is a flow chart illustrating operations performed at a network device that acts as a service function forwarder, according to an example embodiment.

Reference is now made to FIG. 5. FIG. 5 illustrates a flow chart depicting operations performed at a network device (e.g., a service node or service function forwarder). At 330, a network device that is configured to operate as a service node in a service function chain receives service function chain provisioning information via a distributing routing protocol, wherein the provisioning information includes routing information of a form (hop-number index, service function node address, {service function identifier, condition}), wherein hop-number index indicates an index of a service function in the service function chain, service node address is an address of a next service node in the service function chain, service function identifier is an identifier of a service function to be performed at a current service function node, and condition is at least one condition upon which a service function reclassification or branching operation is to be performed.

As explained above, the provisioning information may be received from a route reflector network device. Moreover, the network device may send a query from the network device to the route reflector network device, wherein the query requests information concerning a service function path identifier to use for the at least one condition.

At 340, the network device processes packets received for a traffic flow according to information contained in a service header of the packets and based on the at least one condition contained in the routing information.

As explained above, when the at least one condition specifies a tuple of flow parameters upon which a match flow to parameters in traffic results in a reclassification lookup to determine whether to direct traffic to a particular service function path different from a service function path indicated by the network service header in packets of the traffic flow. The network device (service node) performs a reclassification lookup to determine whether to direct traffic to the particular service function path for packets having flow parameters that match the tuple of flow parameters.

When the at least one condition is an exception indicating that traffic is to be directed to a particular service function path, the network device directs packets to the particular service function path.

When the at least one condition is a metadata branch that indicating the service node is to examine metadata in the network service header of packets to determine if metadata in the network service header matches a particular condition for traffic is to be branched to a particular service function path, the network device directs packets to the particular service function path when there is a match to the particular condition in the metadata of the packets.

Figure 6:
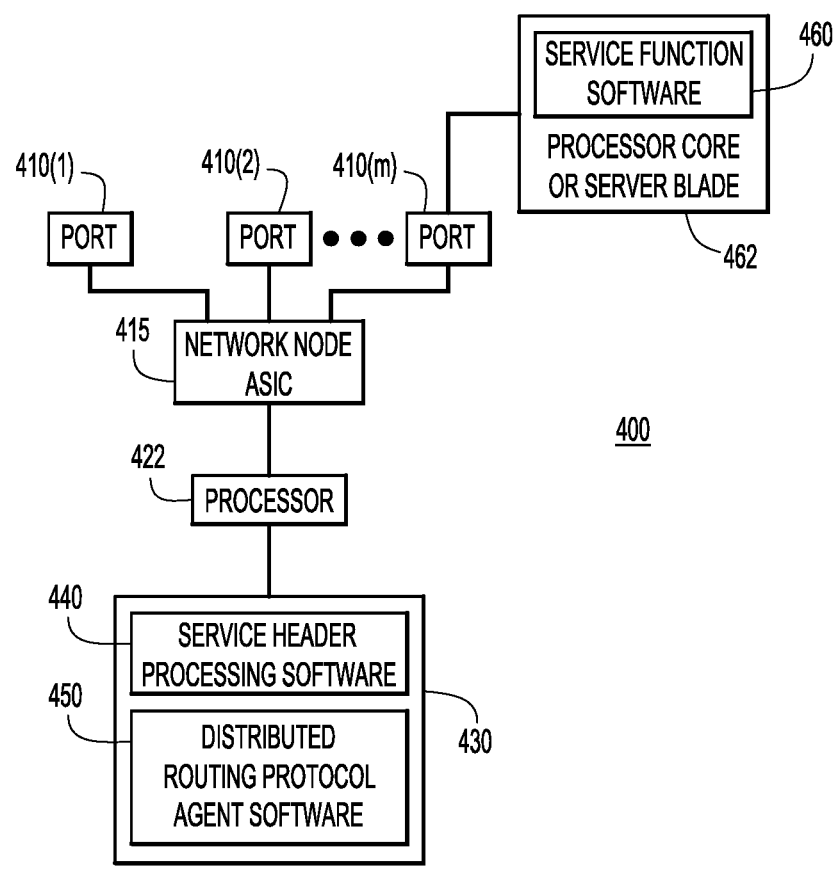
FIG. 6 is a block diagram of a service node configured to perform the operations presented herein, according to an example embodiment.

FIG. 6 illustrates an example block diagram for a network device configured to operate as a service node, and to perform the operations described herein. It should be understood that a virtual network node would be a software-emulated or virtualized version of what is shown in FIG. 6. The network device 400 comprises a plurality of ports 410(1)-410(m), a network Application Specific Integrated Circuit (ASIC) 415, a processor or central processing unit (CPU) 422 and memory 430. The ports 410(1)-410(m) receive ingress packets and output egress packets from the network node. In certain examples, one or more of the ports 410(1)-410(m) are connected to VLANs for forwarding packet data to service-functions.

The network node ASIC 415 directs incoming packets to ports for egress according to logic as well as controls from the processor 422. For example, if the network device is a router, then the ASIC 415 is a router ASIC configured for network routing functions, and if the network node is a switch, then the ASIC 415 is a switch ASIC configured for network switch functions. The processor 422 is a microprocessor or microcontroller, for example, and executes instructions for the service header processing firmware/software 440 stored in memory 430. As shown, the service header processing firmware/software 440 includes dynamic mapping firmware/software 445. The service header processing firmware/software 440 includes instructions which, when executed by the processor 422, cause the processor to perform the operations described herein. In addition, the memory 430 stores instructions for distributed routing protocol agent software 450 that, when executed by processor 422, causes the processor 422 to perform distributed routing protocol (e.g., BGP) advertising and related operations as described herein.

The operations of a service-function are implemented by service-function software 460 running on a processor core or server blade 462 that is in communication with a port, e.g., port 410(m), of the network node.

The memory 430 may include read only memory (ROM), random access memory (RAM), magnetic disk storage media devices, optical storage media devices, flash memory devices, electrical, optical, or other physical/tangible memory storage devices. Thus, in general, the memory 430 may comprise one or more tangible (non-transitory) computer readable storage media (e.g., a memory device) encoded with software comprising computer executable instructions and when the software is executed (by the processor 422) it is operable to perform the operations described herein.

Figure 7:
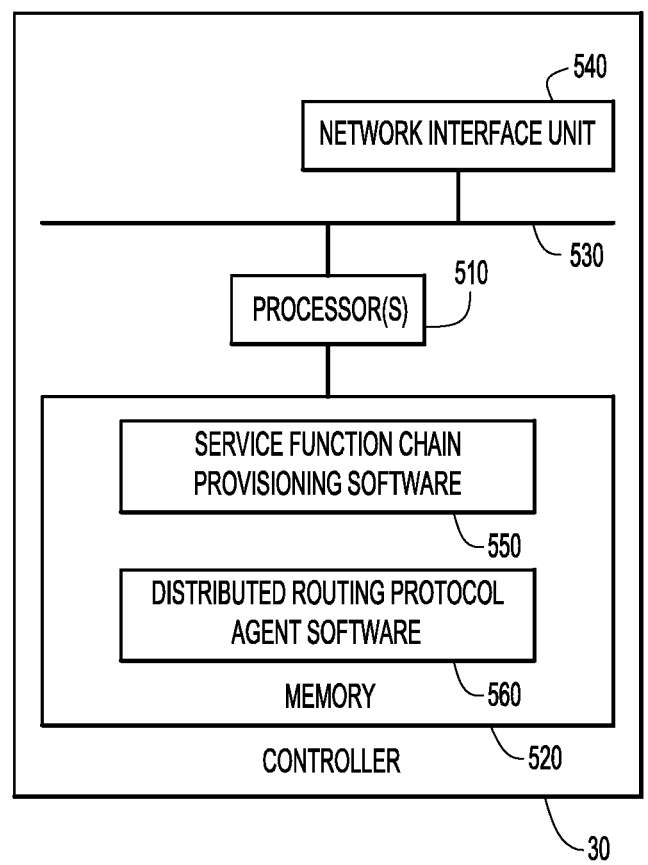
FIG. 7 is a block diagram of a services controller configured to perform the operations presented herein, according to an example embodiment.

Turning now to FIG. 7, an example block diagram is shown for the controller 30. It should be understood that a virtual controller would be a software-emulated or virtualized version of what is shown in FIG. 7, such as software running in a data center or cloud-computing environment. The controller 30 includes one or more processors 510, memory 520, a bus 530 and a network interface unit 540. The processor 510 may be a microprocessor or microcontroller. The network interface unit 540 facilitates network communications between the controller 30 and the service nodes as well as with the BGP RR 30. The processor 510 executes instructions associated with software stored in memory 520. Specifically, the processor 510 service function chain provisioning software 550 that, when executed by the processor 510, causes the processor 510 to perform the operations for the controller 30 described herein to provision a service function chain. In addition, the memory stores distributed routing protocol agent software 860 which includes instructions that, when executed by processor 510, causes the processor 410 to communicate with other entities (e.g., the BGP RR) using a distributed routing protocol, such as BGP.

The memory 520 may include ROM, RAM, magnetic disk storage media devices, optical storage media devices, flash memory devices, electrical, optical, or other physical/tangible memory storage devices. In general, the memory 520 may comprise one or more tangible (non-transitory) computer readable storage media (e.g., a memory device) encoded with software comprising computer executable instructions and when the software is executed (by the processor 510) it is operable to perform the operations described herein.

In summary, presented herein are techniques by which a distributed routing protocol is used to advertise service function chain provisioning information. Moreover, these techniques provide for use of distributing protocol attributes for SFP branching based on reclassification, exception branching or metadata branching. This is done by defining a 'Condition' in routing information that is distributed to the service nodes. This instructs a SFF to know exactly what to do and if the reclassification or branching is needed based on various conditions.

Using these techniques, the controller does not have to communicate with every service node in the service chain. The service nodes are already linked by the a distributed routing protocol. As such, a service node does not have to have the information locally to inform it what to do when a branch or reclassification condition has been configured. Instead the service node can dynamically query the network device that serves to distribute the routing information (e.g., BGP RR) to obtain information as to what path identifier to use for the branch or exception condition.

This system and methods presented herein are distributed and involve no static provisioning of various conditions for SFC branching. They solve the branching problem when using a distributed routing protocol such as BGP as the SFC provisioning distribution mechanism. Again, the service function forwarder simply does another classification lookup, to determine whether a new service function path is to be used, or to jump/branch into a newly defined service function path based on a service condition defined that raises the exception, or to examine the NSH metadata included in a packet to perform the branching, or to continue routing the packet based on the original definition in the service function path. These techniques can be incorporated in various devices using a distributed routing protocol (e.g., BGP) to advertise service function chain provisioning information particular when the service function chain involves branching and/or reclassification. Moreover, these techniques may be applied in physical networking (hardware networking devices) and virtual networking (software network devices).

In one form, a method is provided comprising: at a controller apparatus that is configured to generate provisioning information to establish a service function chain that includes a plurality of service functions to be performed by two or more service nodes, generating the provisioning information so as to include at least one condition upon which a service function reclassification or branching operation is to be performed by at least one of the two or more service nodes; and supplying the provisioning information to a network device which in turn distributes the provisioning information to the two or more service nodes according to a distributed routing protocol.

In another form, an apparatus is provided comprising a network interface unit configured to enable network communications on behalf of a controller apparatus that is configured to generate provisioning information to establish a service function chain that includes a plurality of service functions to be performed by two or more service nodes, and a processor coupled to the network interface unit, wherein the processor is configured to generate the provisioning information so as to include at least one condition upon which a service function reclassification or branching operation is to be performed by at least one of the two or more service nodes; and supply the provisioning information to a network device which in turn distributes the provisioning information to the two or more service nodes according to a distributed routing protocol.

In still another form, one or more non-transitory computer readable storage media is provided that is encoded with software instructions that, when executed by a processor of a controller apparatus that is configured to generate provisioning information to establish a service function chain that includes a plurality of service functions to be performed by two or more service nodes, cause the processor to: generate the provisioning information so as to include at least one condition upon which a service function reclassification or branching operation is to be performed by at least one of the two or more service nodes; and supply the provisioning information to a network device which in turn distributes the provisioning information to the two or more service nodes according to a distributed routing protocol.

In still another form, a method is provided comprising: at a network device configured to operate as a service node in a service function chain, receiving service function chain provisioning information via a distributing routing protocol, wherein the provisioning information includes routing information of a form (hop-number index, service function node address, {service function identifier, condition}), wherein hop-number index indicates an index of a service function in the service function chain, service node address is an address of a next service node in the service function chain, service function identifier is an identifier of a service function to be performed at a current service function node, and condition is at least one condition upon which a service function reclassification or branching operation is to be performed; and processing packets received for a traffic flow according to information contained in a service header of the packets and based on the at least one condition contained in the routing information.

In yet another form, an apparatus is provided comprising: a plurality of ports that send packets to a network and receive packets from a network, network node processing circuitry (e.g., an ASIC), a processor core or server blade configured to execute service function software to perform at least one service function as part of a service function chain, and a processor coupled to the network node processing circuitry and configured to: receive service function chain provisioning information via a distributing routing protocol, wherein the provisioning information includes routing information of a form (hop-number index, service function node address, {service function identifier, condition}), wherein hop-number index indicates an index of a service function in the service function chain, service node address is an address of a next service node in the service function chain, service function identifier is an identifier of a service function to be performed at a current service function node, and condition is at least one condition upon which a service function reclassification or branching operation is to be performed; and processing (or causing the network node processing circuitry to process) packets received for a traffic flow according to information contained in a service header of the packets and based on the at least one condition contained in the routing information.

In another form, one or more non-transitory computer readable storage media is provided that is encoded with software instructions that, when executed by a processor of a network device configured to operate as a service node in a service function chain: receive service function chain provisioning information via a distributing routing protocol, wherein the provisioning information includes routing information of a form (hop-number index, service function node address, {service function identifier, condition}), wherein hop-number index indicates an index of a service function in the service function chain, service node address is an address of a next service node in the service function chain, service function identifier is an identifier of a service function to be performed at a current service function node, and condition is at least one condition upon which a service function reclassification or branching operation is to be performed; and process (or cause network node processing circuitry to process) packets received for a traffic flow according to information contained in a service header of the packets and based on the at least one condition contained in the routing information.

In still another form, a system is provided comprising: a plurality of service nodes, each of which is configured to support one or more service functions to establish a service function chain that includes a plurality of service functions to be performed by routing traffic among the plurality of service nodes; a controller configured to generate provisioning information for the service function chain, the provisioning information including at least one condition upon which a service function reclassification or branching operation is to be performed by at least one service node; and a network device in communication with the controller, wherein the network device is configured to distribute the provisioning information for the service function chain to the plurality of service nodes using a distributed routing protocol.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a controller apparatus that is configured to generate provisioning information to establish a service function chain that includes a plurality of service functions to be performed by two or more service nodes:
   generating the provisioning information so as to include at least one condition upon which a service function reclassification or branching operation is to be performed by at least one of the two or more service nodes, wherein the at least one condition is a metadata branch that instructs a service node to examine metadata in a header of packets to determine if the metadata matches a particular condition and if so then branch the traffic to a particular service function path; and
   supplying the provisioning information to a network device which in turn distributes the provisioning information to the two or more service nodes according to a distributed routing protocol.

2. The method of claim 1, wherein the provisioning information includes routing information comprising a hop-number index, a service function node address, a service function identifier, and a condition, wherein the hop-number index indicates an index of a service function in the service function chain, the service node address is an address of a next service node in the service function chain, the service function identifier is an identifier of a service function to be performed at a current service node, and the condition is the at least one condition.

3. The method of claim 1, wherein the at least one condition further includes a condition that specifies a tuple of flow parameters upon which a match to flow parameters in traffic at a given service function will result in a reclassification lookup to determine whether to direct traffic to a service function path different from a service function path indicated by a network service header embedded in packets of the traffic.

4. The method of claim 1, wherein the at least one condition further includes a condition that is an exception indicating that traffic is to be directed to the particular service function path.

5. The method of claim 1, further comprising receiving from the service nodes advertisements sent according to the distributed routing protocol, the advertisements indicating capabilities of the respective service functions, and wherein generating is performed based on the advertisements.

6. The method of claim 5, wherein receiving comprises receiving the advertisements in Gratuitous Address Resolution Protocol/Neighbor Discovery (ARP/ND) messages.

7. The method of claim 1, wherein the distributed routing protocol is the Border Gateway Protocol (BGP).

8. The method of claim 1, further comprising:
receiving a query from a particular service node, the query requesting information concerning the at least one condition; and
sending information concerning the at least one condition to the particular service node.

9. A method comprising:
at a network device configured to operate as a service node in a service function chain:
receiving service function chain provisioning information via a distributing routing protocol, wherein the provisioning information includes a condition upon which a service function reclassification or branching operation is to be performed, wherein the at least one condition is a metadata branch that indicates the service node is to examine metadata in a header of packets to determine if the metadata matches a particular condition for traffic to be branched to a particular service function path;
processing packets received for a traffic flow according to information contained in a service header of the packets and based on the condition; and
directing packets to the particular service function path when there is a match to the particular condition in the metadata of the packets.

10. The method of claim 9, wherein receiving comprises receiving the provisioning information from a route reflector network device.

11. The method of claim 10, further comprising sending a query from the network device to the route reflector network device, wherein the query requests information concerning the at least one condition.

12. The method of claim 9, wherein the at least one condition further specifies a tuple of flow parameters upon which a match to flow parameters in traffic results in a reclassification lookup to determine whether to direct traffic to a service function path different from a service function path indicated by the service header in packets of the traffic flow, and further comprising performing a reclassification lookup to determine whether to direct traffic to the particular service function path for packets having flow parameters that match the tuple of flow parameters.

13. The method of claim 9, wherein the at least one condition further specifies an exception indicating that traffic is to be directed to the particular service function path, and further comprising directing packets to the particular service function path.

14. The method of claim 9, further comprising, prior to service function chain classification of packets, appending to the packets an application identifier obtained using network based application recognition.

15. A system comprising:
a plurality of service nodes, each of which is configured to support one or more service functions to establish a service function chain that includes a plurality of service functions to be performed by routing traffic among the plurality of service nodes;
a controller configured to generate provisioning information for the service function chain, the provisioning information including at least one condition upon which a service function reclassification or branching operation is to be performed by at least one service node, wherein the provisioning information at least one condition, wherein the at least one condition is a metadata branch that instructs a service node to examine metadata in a header of packets to determine if the metadata matches a particular condition and if so then branch the traffic to a particular service function path; and
a network device in communication with the controller, wherein the network device is configured to distribute the provisioning information for the service function chain to the plurality of service nodes using a distributed routing protocol.

16. The system of claim 15, wherein the provisioning information includes-routing information comprising a hop-number index, a service function node address, a service function identifier, and a condition, wherein the hop-number index indicates an index of a service function in the service function chain, the service node address is an address of a next service node in the service function chain, the service function identifier is an identifier of a service function to be performed at a current service node.

17. The system of claim 16, wherein the at least one condition further specifies a tuple of flow parameters upon which a match to flow parameters in traffic at a given service function will result in a reclassification lookup to determine whether to direct traffic to a service function path different from a service function path indicated by a network service header embedded in packets of the traffic.

18. The system of claim 15, wherein the at least one condition further specifies an exception indicating that traffic is to be directed to the particular service function path.

19. The system of claim 15, wherein the controller is configured to receive from the service nodes advertisements sent according to the distributed routing protocol, the advertisements indicating capabilities of the respective service functions, and the controller is configured to generate the provisioning information based on the advertisements.

20. The system of claim 15, wherein the plurality of service nodes are configured to process packets received for a traffic flow according to information contained in a service header of the packets and based on the at least one condition.

\* \* \* \* \*